Oct. 16, 1928.
J. HELSTROM
1,688,275
DIRIGIBLE HEADLIGHT
Filed Nov. 5, 1925
2 Sheets-Sheet 1
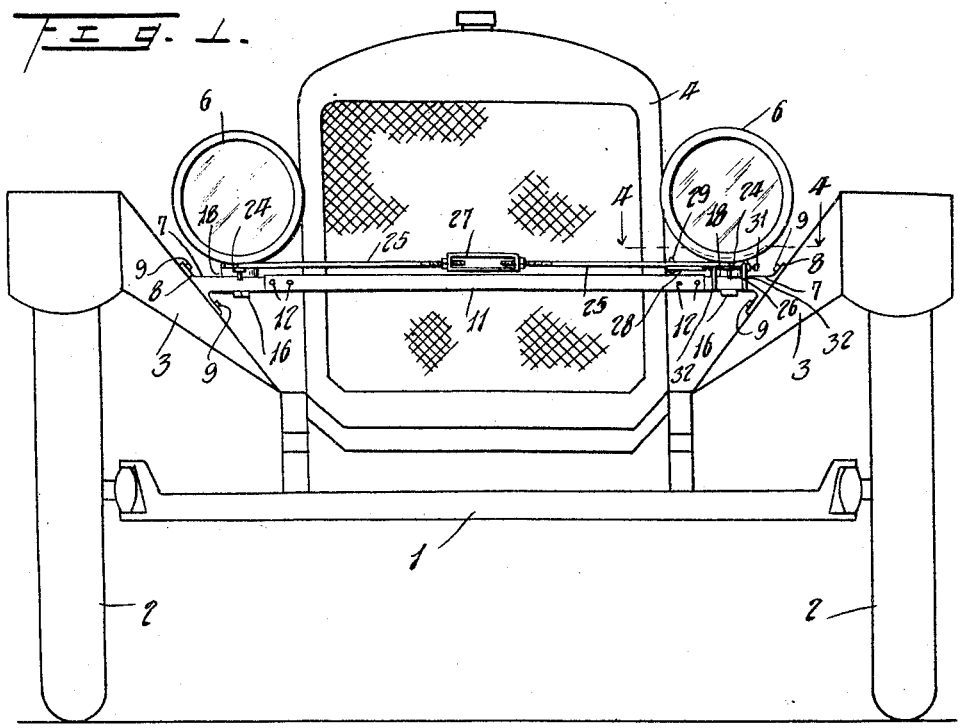
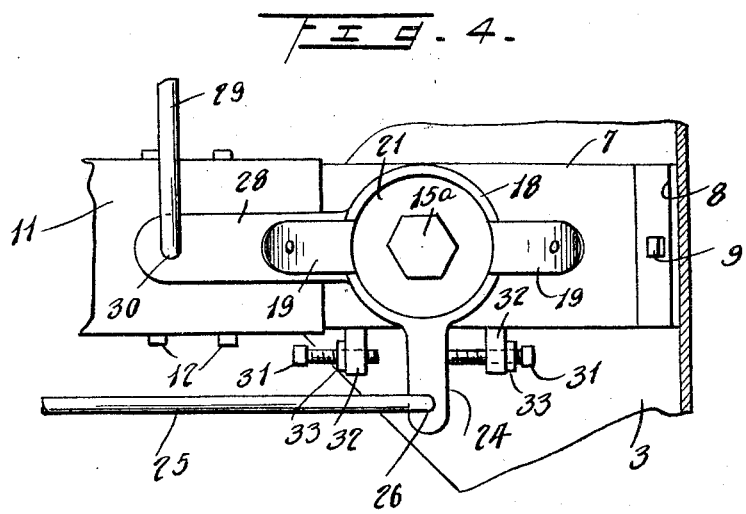
Inventor
J. Helstrom.
By
Attorney Oct. 16, 1928.

J. HELSTROM 1,688,275

DIRIGIBLE HEADLIGHT

Filed Nov. 5, 1925

2 Sheets-Sheet 2

Inventor
J. Helstrom,
By
Attorney

Patented Oct. 16, 1928.

1,688,275

UNITED STATES PATENT OFFICE.

JULMER HELSTROM, OF VIRGINIA, MINNESOTA.

DIRIGIBLE HEADLIGHT.

Application filed November 5, 1925. Serial No. 67,029.

This invention relates to an improved supporting structure for automobile dirigible headlights, and has for one of its objects the provision of a structure of this kind which shall be simple, durable and efficient, which may be readily attached to and between the front fenders of an automobile, and which will permit the headlights to be readily turned.
With the foregoing and other objects in view, the invention consists of the novel construction, combination and arrangement of parts hereinafter fully described and claimed and illustrated in the accompanying drawings, wherein:

Figure 1 is an elevational view illustrating the application of the dirigible headlight supporting structure.

Figure 2:
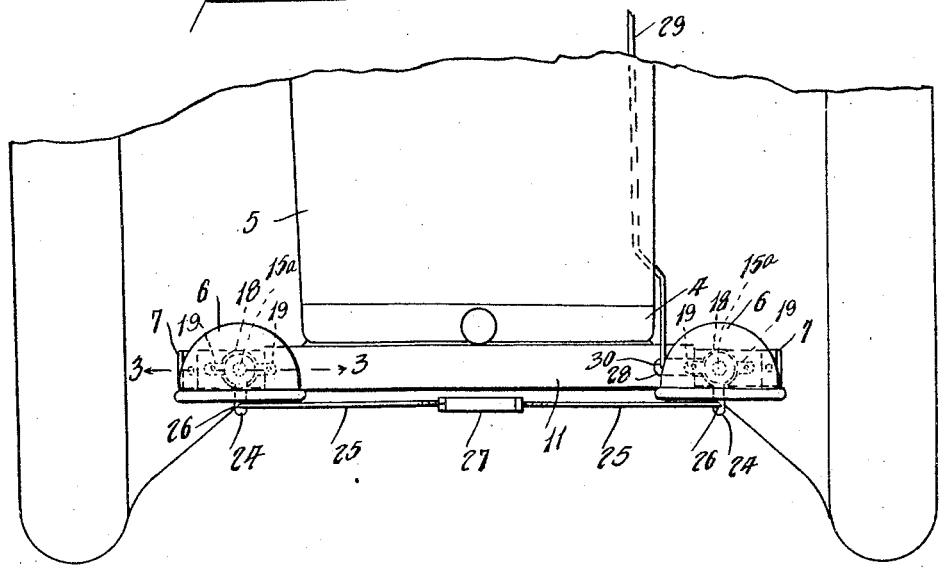
Figure 3:
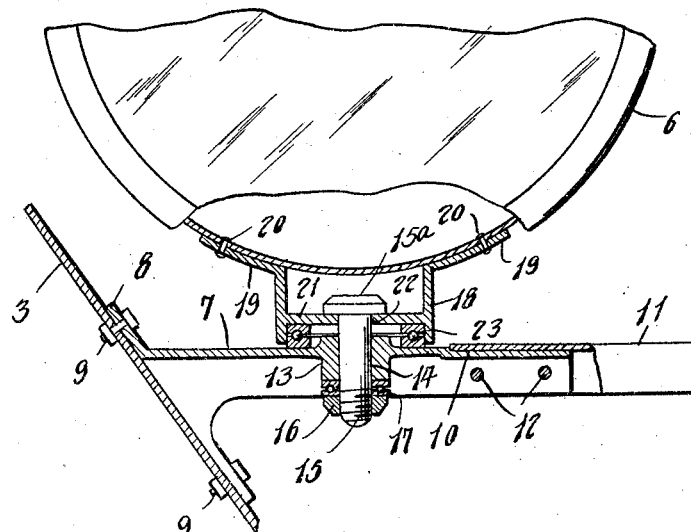

Figure 2 is a top plan view, Figure 3 is a detail sectional view taken on the vertical plane indicated by the line 3—3 of Figure 2, and Figure 4 is a similar view taken on the planes indicated by the line 4—4 of Figure 1.
Corresponding and like parts are referred to in the following description, and designated in the several views of the accompanying drawings, by similar reference characters.
In the drawings, 1 designates the front axle, 2 the front wheels, 3 the front fenders, 4 the radiator, and 5 the engine head of an automobile.

The headlights or lamps 6 of the automobile are rotatably supported by horizontal brackets 7 which are of channel formation and provided at their ends with flanges 8. The brackets 7 are of elongated formation, and are arranged with their open sides disposed lowermost. The attaching flanges 8 are located at the outer ends of the brackets 7 and rest in contact with the inner sides of the fenders 3. Bolts 9 passing through the fenders 3 and flanges 8 secure the brackets 7 in place. The inner ends of the brackets 7 are offset to provide recesses 10 for the reception of the ends of a channel bar 11 which is secured to the brackets 7 by rivets 12 or other suitable attaching elements. The bar 11 is disposed with its open side lowermost and functions to prevent the brackets 7 from having relative inward or outward movement.

The brackets 7 are provided with bosses 13 which are provided with vertical openings 14 for the rotatable reception of bolts 15. The bolts 15 are retained in place by nuts 16 which are mounted thereon below the bosses 13 and between which and the lower ends of the bosses are anti-friction bearings 17. Standards 18 of hollow cylindrical formation, are rotatably secured to the upper sides of the brackets 7 by the bolts 15. The standards 18 are each provided at its upper end with diametrically opposed and upwardly and outwardly curved ears 19. The headlights 6 rest upon and are secured to the ears 19 by rivets 20 or other suitable attaching elements. Plates 21 extending diametrically of and spaced upwardly from the lower ends of the standards 18, are provided with openings 22 for the reception of the bolts 15. The heads 15ª of the bolts 15 contact with the upper sides of the plates 21, and the plates rest upon anti-friction bearings 23 which are positioned on the brackets 7 about the upper ends of the bosses 13. The plates 21 are arranged above the lower ends of the standards 18 to permit the standards to receive and house the bearings 23, and the plates support the lower ends of the standards out of contact with the brackets 7.

The standards 18 are provided with forwardly extending arms 24 to which the ends of a tie rod 25 are pivotally connected as shown at 26. The tie rod 25 is of sectional formation, and the sections thereof are adjustably connected by a turn buckle 27. One of the standards 18, and preferably that one located at the left hand side of the automobile, is provided with an arm 28 having an angular arrangement with respect to its arm 24. A rod 29 pivotally connected as at 32 to the arm 28, extends rearwardly from this arm to the steering column, not shown, of the automobile. The rod 29 is adapted to establish a connection between the headlights 6 and any suitable operating means which may be and preferably is of the construction disclosed in my copending application, filed March 27, 1925, and serially numbered 18,816. This means is adapted to hold the headlights 6 in their normal position and permits them to be turned to the right and returned to their normal position, as for the purpose fully set forth in said application. One of the brackets 7, and preferably the one at the left hand side of the automobile is provided with bolts 31 which are arranged at opposite sides of the arm 24 and adapted to limit the swinging movement of the headlights 6. The bolts 31 are adjustably mounted in lugs 32 extending forwardly from this bracket 7, and are adapted to be secured in adjusted position by lock nuts 33.

From the foregoing description, taken in connection with the accompanying drawings, the advantages of the construction of the headlight supporting structure will be readily apparent to those skilled in the art to which the invention appertains. While I have described the principle of operation of the invention, together with the device which I now consider to be the best embodiment thereof, I desire to have it understood that the device shown is merely illustrative, and that such changes may be made therein when desired as are within the scope of the invention as claimed.

What is claimed is:—

A dirigible headlight, comprising a mounting consisting of a circular hollow standard, outwardly and upwardly curved ears adapted to engage a headlight casing to support it on the standard, a plate arranged within the standard intermediate of the ends thereof, means engaging said plate for mounting said standard and the headlight casing for rotation, an anti-friction bearing engaging said plate and supporting the standard, said bearing being enclosed by the standard below the plate, and an arm extending radially from the standard and adapted for actuation to rotate the standard.

In testimony whereof I affix my signature.

JULMER HELSTROM.